United States Patent [19]

Takahashi et al.

[11] 4,155,951

[45] May 22, 1979

[54] POLYESTER MODIFIERS FOR VINYL HALIDE POLYMERS

[75] Inventors: Akio Takahashi, Amherst; Geoffrey H. Smith, North Tonawanda; George C. Hopkins, Clarence, all of N.Y.

[73] Assignee: Hooker Chemicals & Plastics Corp., Niagara Falls, N.Y.

[21] Appl. No.: 662,622

[22] Filed: Mar. 1, 1976

Related U.S. Application Data

[60] Division of Ser. No. 545,942, Jan. 31, 1975, Pat. No. 3,956,422, which is a continuation-in-part of Ser. No. 491,190, Jul. 24, 1974, abandoned.

[51] Int. Cl.$^2$ .............................................. C08L 67/06
[52] U.S. Cl. .................................... 260/869; 260/873
[58] Field of Search ................................. 260/869, 873

[56] References Cited

U.S. PATENT DOCUMENTS

| 3,501,554 | 3/1970 | Aylesworth | 260/873 |
|---|---|---|---|
| 3,594,439 | 7/1971 | Baker | 260/863 |

*Primary Examiner*—J. Ziegler
*Attorney, Agent, or Firm*—Peter F. Casella; James F. Mudd; David A. Stein

[57] ABSTRACT

Polyvinyl halide or polyvinyl halide graft copolymers intimately mixed with a polyester derived mainly from an halogenated bicycloheptene carboxylic acid or anhydride such as chlorendic acid or anhydride and an alkylene glycol or alkylene oxide such as ethylene glycol or ethylene oxide are provided. The graft copolymers of the invention are obtained by polymerizing a vinyl halide in bulk in contact with an olefin polymer. The graft copolymer compositions of the invention have good clarity and provide improved processing characteristics and increased impact strength without reduction in heat distortion resulting from the addition of the polyester. The improved impact strength polyvinyl halide compositions of the invention can include blends of the polyester of the invention with modifying compounds, such as alkyl methacrylate-butadiene/styrene graft polymer impact modifiers and halogenated polyvinyl chloride. Blends of vinyl halide polymers with the polyesters of the invention provide compositions having improved processability. A reduction in melt viscosity and fusion temperature can be obtained in the blends while maintaining or increasing heat distortion temperature. The compositions of the invention are useful in the production of molds made by extrusion, injection, blow, and sheet molding processes.

5 Claims, No Drawings

POLYESTER MODIFIERS FOR VINYL HALIDE POLYMERS

CROSS REFERENCE TO RELATED APPLICATION

This is a division of application Ser. No. 545,942, filed Jan. 31, 1975 now U.S. Pat. No. 3,956,422, which is a continuation-in-part of Ser. No. 491,190, filed July 24, 1974, now abandoned.

BACKGROUND OF THE INVENTION

Copolymerization and/or compounding of vinyl halide polymer compositions is necessary because of the limitations of vinyl halide homopolymers. One such limitation is the difficulty encountered in processing vinyl halide homopolymers at elevated temperatures. Processing of vinyl halide homopolymers on mill rolling banks can be improved by blending with acrylic copolymer processing aids as previously referred to. While acrylic copolymer processing aids improve the rolling bank and other processing characteristics of vinyl halide compositions during mill processing, usual fabrication temperatures for rigid vinyl halide polymer compositions can lead to thermal degradation of these compounds during extended fabrication periods, for instance during extrusion, injection, thermal forming, blow molding and the like.

It is common to employ certain compounds such as organic ester plasticizers to flexibilize vinyl halide polymer compositions at service temperatures. Such additives reduce the melt viscosity of the vinyl halide polymer, but adversely affect the heat deflection temperature at elevated temperatures. The improvement in processing characteristics without reduction in heat deflection temperature of the vinyl halide graft copolymer at elevated temperatures is only one deficiency of such compositions which is improved by the incorporation of the polyesters of the invention.

Another example of a limitation of the vinyl halide polymers is low impact strength. While graft copolymerizing vinyl halide monomers in the presence of olefin polymers provides compositions having good impact strength, the vinyl halide graft copolymer composition is opaque. It has now been discovered that the polyesters of the invention form homogeneous compositions with vinyl halide graft copolymers based on olefin polymers which exhibit improved impact strength over such vinyl halide graft copolymers. The incorporation of the polyesters of the invention in addition provides a means of modifying vinyl halide graft copolymers to improve impact strength without reducing the heat deflection temperature at elevated temperatures. Depending upon the amount of the polyester of the invention contained in homogeneous compositions of polyester and vinyl halide graft copolymer compositions of the invention, the heat distortion temperature can even be increased. The polyesters of the invention in blends with vinyl halide graft copolymers also act to improve the processing characteristics and reduce melt viscosity.

DESCRIPTION OF THE PRIOR ART

Polyvinyl chloride is widely used in the production of plastic articles. In almost all uses, the polyvinyl chloride must be modified by compounding or copolymerization with other materials to provide processable and useful compositions. It is known that improved impact strength vinyl halide polymers such as polyvinyl chloride can be prepared by graft polymerizing vinyl chloride in contact with an olefin polymer which can be a homopolymer, copolymer or halogenated derivative thereof and can also contain a diene as a monomer unit, but these compositions are opaque. For instance, an ethylene propylene diene-modified polymer of 300,000 weight average molecular weight, as well as similar polymers having lower molecular weight in the range of 50,000 to 150,000 are effective, when a vinyl halide polymerization is conducted in the presence of such polymers, in providing vinyl halide graft copolymer having improved impact strength. The preparation of such graft copolymers is further described in copending, commonly assigned application Ser. No. 427,895, filed Dec. 26, 1973, is hereby incorporated by reference. Ser. No. 427,895 is a continuation-in-part of Ser. No. 251,099, filed May 8, 1972. Vinyl halide polymers can also be modified for improved impact strength by the use of acrylic elastomer impact modifiers, butadiene copolymers and the like. Improved processability can be obtained in vinyl halide polymers by the use of blends with polymeric materials such as acrylic polymers, i.e., copolymers of methyl methacrylate and ethyl methacrylate or chlorinated polyethylene and many others.

It is known from U.S. Pat. No. 3,686,361 to utilize polyester modifiers prepared from terephthalic acid/1,2-propylene glycol for polyvinyl chloride compositions in order to improve processing characteristics without significant effect on other physical properties at normal service temperatures. Such polyesters can be prepared using terephthalic acid in a major proportion together with a mixture of dibasic acids such as chlorendic acid. Aliphatic or aromatic diols can be utilized. Blends of polyvinyl chloride and acrylic type processing modifier and polyester are known to provide clear compositions having good impact strength. It is unexpected that the impact strength of blends of polyvinyl chloride with impact strength modifiers can be increased by the incorporation of the rigid, brittle polyesters of the invention such as chlorendic acid based polyesters. It is further unexpected that blends of the polyesters of the invention with polyvinyl chloride show improved processing characteristics without concurrent use of terephthalic acid based polyesters.

It is also known from U.S. Pat. No. 3,574,789 that polyesters prepared from essentially completely saturated precursors, said polyesters having a crystalline melting point below the processing temperature of the polyvinyl chloride with which the polyester resin is blended (in a proportion of about 2 to 25 parts on a weight basis of polyester resin based on 100 parts by weight of polyvinyl chloride resin) provide polyvinyl chloride compositions having reduced melt viscosity. Desirable rigidity is retained and the products are homogeneous and show improved tensile strength and increased heat deflection temperature without significant sacrifice in impact strength or heat stability. Blends of the polyesters of the invention with either (1) polyvinyl chloride and impact strength modifiers or (2) polyvinyl chloride graft copolymers with good impact strength show improved impact strength over the base compositions (1) and (2).

It is known from U.S. Pat. No. 3,718,715 that polyesters having a long chain ester unit of a molecular weight of about 600 to 6,000 and a short chain ester unit having a molecular weight of less than about 250 with at least one low molecular weight type carboxylic acid having a molecular weight of less than 300 provide blends with polyvinyl chloride which show improved abrasion resistance, low temperature flexibility and impact resistance as well as improved processing characteristics. It is unexpected that the rigid, brittle chlorendic acid or anhydride based polyesters of the invention provide improved impact strength in blends with impact strength modified polyvinyl chloride.

SUMMARY OF THE INVENTION

This invention relates to intimately mixed vinyl halide polymer compositions having improved impact strength and processing characteristics comprising a polyvinyl halide graft copolymer and a polyester derived from an halogenated bicycloheptene carboxylic acid or anhydride such as chlorendic acid or anhydride or mixture of chlorendic acid or anhydride with other dibasic acids and an alkylene glycol or alkylene oxide, such as ethylene glycol or ethylene oxide or mixtures of ethylene glycol or ethylene oxide with alkylene diols or alkylene oxides having a molecular weight of between about 1,000 to about 10,000 number average molecular weight. The intimately mixed polymer compositions show improved impact strength without reduction in the heat deflection temperature of the base polyvinyl halide graft copolymer.

The polyvinyl halide graft copolymer is prepared by bulk polymerizing components comprising at least 80% by weight of a vinyl halide and 0.05 up to about 20% by weight of a polyolefin based upon the weight of said vinyl halide. The polyolefin can be a homopolymer having 3 to 8 carbon atoms in the monomeric units or a copolymer having 2 to 8 carbon atoms in the monomeric units. The polyolefin can also be a halogenated polyolefin such as chlorinated polyethylene. The bulk polymerization process for the production of the vinyl halide graft copolymers can comprise a single or two-stage process.

In another aspect, this invention relates to intimately mixed vinyl halide polymer compositions having improved impact strength and processing characteristics comprising blends of a vinyl chloride polymer with impact strength modifiers such as alkyl methacrylate-butadiene/styrene graft polymers, together with a polyester derived from an halogenated bicycloheptene carboxylic or anhydride compound and an alkylene glycol or alkylene oxide. The addition of the polyester of the invention provides improved impact strength and processability in the compositions in comparison with the blends of vinyl chloride polymer and impact strength modifiers.

In yet another aspect, this invention relates to intimately mixed vinyl halide polymer compositions having improved processability. Reduced melt viscosity and fusion temperature are obtained by blending said polymer compositions with the polyesters of the invention. Heat distortion temperature of the blends is maintained or increased in direct proportion to the concentration of the polyesters of the invention contained in the polymer composition.

DESCRIPTION OF THE PREFERRED EMBODIMENTS

Improved processing vinyl halide polymers can be obtained by blending said polymers with the polyesters of the invention. Such blends show lower melt viscosity and fusion temperature as compared to the starting vinyl halide polymer. Heat distortion temperature is maintained or improved over that of the starting polymer.

Suitable vinyl halide monomers useful in preparing the vinyl halide polymer compositions utilized in the invention are the alpha-halo-substituted ethylenically unsaturated compounds which are capable of entering into an addition polymerization reaction, for example, vinyl fluoride, vinyl chloride, vinyl bromide, vinyl iodide, vinylidene fluoride, vinylidene chloride, vinylidene bromide, vinylidene iodide and the like, although vinyl chloride is preferred. The polymers of the present invention can be formed of the same or different alpha-halo-substituted ethylenically unsaturated materials and, thus, the invention includes homopolymers, copolymers, and interpolymers formed by addition polymerization. Illustrative of these copolymers is a copolymer of vinyl chloride and vinylidene chloride.

While it is preferred that the monomer composition be comprised totally of vinyl halide monomer as described above, the present invention is also intended to include copolymers formed by the free-radical addition polymerization of a monomer composition containing a predominant amount, e.g., at least 50 percent of vinyl halide and a minor amount, e.g., up to 50 percent by weight of another ethylenically unsaturated monomer composition copolymerizable therewith. Preferably, the other ethylenically unsaturated monomer is used in amounts of 20 percent or less by weight and more preferably in amounts of 10 percent or less by weight of the total monomer used in preparing the polymer. Suitable ethylenically unsaturated compounds which can be used to form copolymers, interpolymers and the like, are illustrated by the following monoolefinic hydrocarbons, i.e., monomers containing only carbon and hydrogen, including such materials as ethylene, propylene, 3-methylbutene-1, 4-methylpentene-1, pentene-1, 3,3-dimethylbutene-1, 4,4-dimethylbutene-1, octene-1, decene-1, styrene and its nuclear alpha-alkyl or aryl substituted derivatives, e.g., o-, m- or p-methyl, ethyl, propyl or butyl styrene; alphamethyl, ethyl, propyl or butyl styrene; phenyl styrene, and halogenated styrenes such as alpha-chlorostyrene; monoolefinically unsaturated esters including vinyl esters, e.g., vinyl acetate, vinyl propionate, vinyl butyrate, vinyl stearate, vinyl benzoate, vinyl-p-chlorobenzoates, alkyl methacrylates, e.g., methyl, ethyl, propyl and butyl methacrylate; octyl methacrylate, alkyl crotonates, e.g., octyl; alkyl acrylates, e.g., methyl, ethyl, propyl, butyl, 2-ethyl hexyl, stearyl, hydroxyether and tertiary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate and ethyl alpha-chloroacrylate, methyl alpha-bromoacrylate, ethyl alpha-bromoacrylate, methyl alpha-fluoroacrylate, ethyl alpha-fluoroacrylate, methyl alpha-iodoacrylate and ethyl alpha-iodoacrylate; alkyl alpha-cyanoacrylates, e.g., methyl alpha-cyanoacrylate and ethyl alpha-cyanoacrylate maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate; and diethyl glutaconate; monoolefinically unsaturated organic nitriles including, for example, fumaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, famaric and itaconic acids, maleic anhydrides and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl 2-chloroethyl ether, vinyl cetyl ether and the like; and vinyl sulfides, e.g., vinyl beta-chloroethyl sulfide, vinyl beta-ethoxyethyl sulfide and the like can also be included. as can diolefinically unsaturated hydrocarbons containing two olefinic groups in conjugated relation and the halogen derivates thereof, e.g., butadiene-1,3; 2-methyl-butadiene-1,3; 2,3-dimethylbutadiene-1,3; 2-chloro-butadiene-1,3; 2,3-dichloro-butadiene-1,3; and 2-bromo-butadiene-1,3 and the like.

Specific monomer compositions for forming copolymers can be illustrated by vinyl chloride and/or vinylidene chloride and vinyl acetate, vinyl chloride and/or vinylidene chloride and maleic or fumaric acid esters, vinyl chloride and/or vinylidene chloride and acrylate or methacrylate ester, vinyl chloride and/or vinylidene chloride and vinyl alkyl ether. These are given as illustrative of the numerous combinations of monomers possible for the formation of copolymers. The present invention includes all such combinations.

The free radical bulk polymerization of the monomer composition is conducted in the presence of an olefin homopolymer, copolymer or terpolymer and halogenated derivatives thereof. The olefin polymers can also contain a diene as a monomer unit.

Suitable monomers are propene, butene-1, isobutene, pentene, hexene, heptane, octene, 2-methylpropene-1, 3-methylbutene-1, 4-methylpentene-1, 4-methylhexene-1, 5-methylhexene-1.

Suitable comonomers are those utilized to prepare homopolymers as listed above such as propene or butene-1 with ethene or isobutylene with isoprene and the like. Suitable termonomers are those utilized to prepare homopolymers and copolymers as disclosed above such as propene, ethene and the like containing up to 15 percent preferably up to about 6 percent by weight of a diene such as dicyclopentadiene, butadiene, cyclooctadiene and other non-conjugated dienes with linear or cyclic chains.

The polyolefins used are characterized by being soluble, partially soluble or dispersible at normal room temperature and pressure in vinyl chloride monomer and if a homopolymer having monomeric units with 2 to 8 carbon atoms; if copolymers, having monomeric units with 2 to 8 carbon atoms; and if a halogenated polymer, having monomeric units with 2 to 8 carbon atoms. Suitable halogenated polyolefins are the chlorinated, brominated, or fluorinated polyolefins. The weight average molecular weight of the olefin polymers and copolymers can vary from about 50,000 to about 300,000 and higher, up to 1,000,000 and higher, preferably the olefin polymers have an apparent molecular weight as measured by solution viscosity of about 50,000 to about 200,000. The olefin polymer can be liquid or solid as desired. Where a maximum reduction in melt viscosity is desired in the polymer produced, the olefin polymer used is a low molecular weight rubbery material having a molecular weight of between about 80,000 and 150,000. Where maximum grafting efficiency during polymerization is desired, i.e., where only a slight amount of ungrafted olefin polymer is desired to be left in the graft polymer, a high molecular weight polyolefin is utilized having a weight average molecular weight of higher than about 300,000 and can range up to 1,000,000 and higher. Preferably, a weight average molecular weight of 400,000 to 800,000 is utilized.

The free radical bulk polymerization can take place in accordance with the process of the invention at temperatures between 25 and 90 degrees centigrade. The polymerization reaction is conducted in the presence of a free radical initiator. Useful free-radical initiators are organic or inorganic peroxides, persulfates, ozonides, hydroperoxides, peracids and percarbonates, azo compound, diazonium salts, diazotates, peroxysulfonates, trialkyl borane-oxygen systems, and amine oxides. Azobisisobutyronitrile is particularly useful in the present invention. The catalyst is used in concentration ranging from about 0.01 to about 1.0 percent by weight based on the total weight of the monomers. For use in bulk polymerization, the catalysts which are soluble in the organic phase, such as benzoyl peroxide, diacetyl peroxide, azobisisobutyronitrile or diisopropyl peroxydicarbonate, azobis (alpha-methyl-gamma-carboxybutyronitrile), caprylyl peroxide, lauroyl peroxide, azobisisobutyramidine hydrochloride, t-butyl peroxypivalate, 2,4-dichlorobenzoyl peroxide, azobis (alpha-gamma-dimethylvaleronitrile), and 2,2'-azobis(2,4-dimethyl valeronitrile) are generally used. Preferably, the initiator which is used is chosen from a group of initiators known in the prior art as the "hot catalysts" or those which have a high degree of free-radical initiating activity. Initiators with a lower degree of activity are less desirable in that they require longer polymerization times. Also, long polymerization times may cause preliminary product degradation evidenced by color problems, e.g., pinking.

The polyesters of the invention are predominantly the reaction products of a halogenated bicycloheptene polycarboxylic compound and a polyhydric alcohol or epoxide and are members of the widely known structural classed termed "polyesters". Compounds of the polyester class are, in general, the reaction products of a polycarboxylic compound and a polyhydric compound.

By polycarboxylic acid compound is meant polycarboxylic acids, polycarboxylic anhydrides, polycarboxylic acid halides and polycarboxylic acid esters including both unsaturated and saturated types.

Unsaturated polycarboxylic compounds, i.e. those containing aliphatic or cycloaliphatic carbon-to-carbon multiple bonds, known to be useful in preparation of polyesters include for example, maleic, chloromaleic ethylmaleic; itaconic, citraconic, mesaconic, pyrococinchonic, acetylene dicarboxylic acids, and the corresponding acid halides, esters and anhydrides thereof, either alone or in admixture. Aconitic and isaconitic acids are representative of useful unsaturated polycarboxylic compounds having three carboxylic functional groups per molecule and 1,4-cyclohexadiene-1,2,4,5-tetracarboxylic acid and its dianhydride exemplify unsaturated polycarboxylic compounds having four carboxylic groups per molecule.

Saturated polycarboxylic compounds which can be aliphatic, cycloaliphatic, aromatic or heterocyclic, include for example phthalic, isophthalic, terephthalic, tetrachlorophthalic, tetrabromophthalic, adipic, glutaric, succinic, cyclohexyl dicarboxylic and cycloheptane dicarboxylic acids and the corresponding anhydrides acid halides and anhydrides thereof either alone or in admixture. Examples of useful saturated polycarboxylic compounds containing more than two carboxylic functional groups include trimesic and tricarballylic acids which contain three carboxylic functional groups per molecule and pyromellitic acid and its dianhydride and butane-1,2,3,4-tetracarboxylic acid which contain four carboxylic groups per molecule.

By polyhydric compound is meant unsaturated or saturated compounds containing two, three or more alcoholic or phenolic hydroxyl substituents per molecule and, in the case of the alcoholic hydroxyl containing saturated aliphatic compounds, corresponding alkylene oxides or epoxides.

Unsaturated polyhydric compounds, i.e. those containing aliphatic carbon-to-carbon multiple bonds, include for example, the vinyl ether of glycerol, butene diol, hexane diol, octene diol, and pentene diol. Examples of unsaturated polyhydric compounds containing more than two hydroxy groups per molecule include the allyl ester of butane tetrol which contains three hydroxy groups per molecule and cyclohex-5-ene-1,2,3,4-tetrol and the allyl ether of pentaerythritol which contain four hydroxy groups per molecules.

Saturated polyhydric compounds used in the art to prepare polyesters include ethylene glycol and the corresponding alkylene oxide, ethylene oxide, 1,2-propylene glycol and the corresponding akylene oxide, propylene oxide, 1,4-butylene glycol and the corresponding alkylene oxide, tetrahydrofuran, 1,5-hexane diol; bisphenols, such as 2,2-bis(4-hydroxyphenyl)propane and bis(4-hydroxyphenyl)methane: substituted bisphenols, such as bis(3-chloro-4-hydroxyphenyl)methane; hydrogenated bisphenols and mixtures thereof, diethylene glycol; triethylene glycol; and higher polyethylene glycols; 1,3-propylene glycol; dipropylene glycol and higher polypropylene glycols; 1,3-butylene glycol, neopentyl glycol; and substituted versions of the foregoing alkylene glycols and the like; cycloalkylene glycols such as 1,2-cyclopentanediol, 1,3-cyclopentanediol, 1,2-cyclohexanediol, 1,3-cyclohexanediol, 1,4-cyclohexanediol, cyclobutanediols, cyclobutane dimethanol, cyclohexane dimethanol, substituted versions of these cycloaliphatic glycols and the like; and aryl glycols such as ethylene oxide or propylene oxide adducts of para, para-isopropylidene diphenol and the like. Illustrative of saturated polyhydric compounds which contain more than two hydroxy groups per molecule are glycerol, phloroglucinol, and trimethylol propane which contain three hydroxy groups per molecule, sorbitol and mannitol which contain six hydroxy groups per molecule and butene tetrol and its diepoxide, butane 1,2,3,4-diepoxide, which contain four hydroxy groups per molecule or what is equivalent thereto, i.e. two alkylene oxide groups per molecule.

Mixtures of the various types of polycarboxylic compounds and polyhydric compounds can be employed in the preparation of polyesters. For example polyesters can be prepared from a mixture of a saturated polycarboxylic compound, a saturated polyhydric compound and an unsaturated polyhydric compound; from a mixture of an unsaturated polycarboxylic compound, a saturated polycarboxylic compound and a saturated polyhydric compound; from a mixture of saturated polycarboxylic compound or compounds, and unsaturated polyhydric compound or compounds, from a mixture of saturated polycarboxylic compound or compounds and saturated polyhydric compound or compounds or from a mixture of unsaturated polycarboxylic compound or compounds and unsaturated polyhydric compound or compounds.

Polyesters can be prepared by several synthetic methods such as bulk, solution, and interfacial condensation procedures. The polyesters can be conveniently obtained through esterification of a polyhydric reactant, e.g. a glycol mixture, with a polycarboxylic reactant, e.g. a dibasic acid mixture, with heat and catalyst, such as metal salts of lead, tin, calcium, zinc and antimony, along with organometallic compounds derived from such metals as tin and titanium. An advantageous procedure for the preparation of polyesters involves introducing the selected esterification reactants in predetermined proportions into a suitable esterification vessel provided with heating and/or cooling means, an agitator, means for maintaining an atmosphere of an inert gas, such as nitrogen or carbon dioxide, over the reaction mixture, means for removing water of esterification, an inlet, an outlet, and any accessories that are necessary for the reaction. The charged reactants are blanketed with an inert atmosphere, then agitated and heated to effect the reaction for the specified period of time. After the desired degree of reaction has been attained, as conveniently determined by employing the acid number technique or measuring the amount of water liberated, the reaction mixture is cooled.

The proportion of polycarboxylic and polyhydric reactants used in preparing polyesters can be substantially stoichiometrically equivalent or either the polycarboxylic reactant or the polyhydric reactant can be in substantial stoichiometric excess. When it is desired to prepare a polyester devoid of carboxylic acid terminations the acid functional group terminations in the polyester can be esterified by conventional reaction with a monohydric alcohol such ethanol, n-butanol, undecanol and the like. Alternatively it is known to prepare polyesters devoid of acid functional group terminations by the above described expedient of reacting the polycarboxylic compound with a stoichiometric excess of the polyhydric compound so as to obtain a hydroxy-terminated polyester.

The polyesters of the above described class which are useful in the practice of the invention are those of number average molecular eight of about 1,000 to about 10,000 which are derived from the reaction of a polycarboxylic reactant which contains at least 75 mole percent of a halogenated bicycloheptene polycarboxylic compound with polyhydric reactant which contains at least 75 mole percent of ethylene glycol or oxide thereof, the polycarboxylic compound reactant containing no more than about 5 mole percent of polycarboxylic compounds having more than two carboxylic functional groups per molecule and the polyhydroxy compound reactant containing no more than 5 mole percent of polyhydric compounds having more than two hydroxy groups or more than one oxide group per molecule.

In other words, there is employed in the invention a polyester of number average molecular weight of about 1,000 to about 5,000 comprising a polycarboxylic component and a polyhydric component wherein said polycarboxylic component comprises at least about 75 mole percent of a halogenated bicycloheptene polycarboxylic compound, and wherein said polyhydric component comprises at least about 75 mole percent of ethylene glycol, ethylene oxide or mixtures thereof with the proviso that no more than about 5 mole percent of said polycarboxylic component are polycarboxylic components containing more than two carboxylic functional groups per molecule and no more than about 5 mole percent of said polyhydric component are polyhydric components containing more than two hydroxy groups or more than one oxide group per molecule.

Typical of, but not limiting with respect to polycarboxylic compounds useful in preparation of these polyesters are the dibasic acids and the anhydrides thereof such as chlorendic acid and chlorendic anhydride which are illustrative of halogenated bicycloheptene dicarboxylic compounds and maleic, phthalic, tetrabromophthalic, tetrachlorophthalic acids and anhydrides which are illustrative of the other dicarboxylic compounds which may be utilized in admixture with such halogenated dicarboxylic compounds.

As will be apparent to those skilled in the art, the residue of a polycarboxylic acid and the residue of the corresponding anhydride are essentially identical in the polyester art as is the case with the residue of a polyhydric compound and the residue of its corresponding oxide.

Representative halogenated bicycloheptene polycarboxylic compounds which are useful in preparing the polyesters of the invention include the following compounds which are readily available as Diels-Alder adducts of hexahalocyclopentadienes and unsaturated dicarboxylic acids and anhydrides:

1,4,5,6,7,7-hexachlorobicyclo-(2.2.1)-5-heptene-2,3-dicarboxylic acid, i.e. chlorendic acid;
1,4,5,6,7,7-hexachlorobicyclo-(2.2.1)-5-heptene-2,3-dicarboxylic anhydride, i.e. chlorendic anhydride;
1,4,5,6,7,7,-hexachloro-2-methyl-bicyclo-(2.2.1)-5-heptene-2,3-dicarboxylic anhydride;
the mono- or dimethyl ester of 1,4,5,6,7,7-hexachlorobicyclo-(2.2.1)-5-heptene-3-dicarboxylic acid;
1,4,5,6-tetrachloro-7,7difluorobicyclo-(2.2.1)-5-heptene-2,3-dicarboxylic acid;
1,4,5,6,7,7-hexachlorobicyclo-(2.2.1)-5-heptene-2-acetic-2-carboxylic anhydride;
1,4,5,6,7,7-hexachlorobicyclo-(2.2.1)-5-heptene-2,3-dicarbonyl chloride;
5,6,7,8,9,9-hexachloro-1,2,3,4,4a,5,8,8a-octahydro-5,8-methano-2,3-naphthalene dicarboxylic acid and anhydride; and
1,2,3,4,5,6,7,7-octachloro-3,6-methano-1,2,3,6-tetrahydrophthalic acid and anhydride.

It is preferred that the halogenated bicycloheptene carboxylic compound be chlorendic acid or anhydride, the residue of said halogenated polycarboxylic compound constituting at least about 75 mole percent of said polycarboxylic component. However other halogenated bicycloheptene carboxylic acids or anhydrides can be used instead, such as the other adducts of hexahalocyclopentadiene and polycarboxylic compounds described above. Up to 25% of the polyester of the invention can be derived from other saturated or unsaturated polycarboxylic compounds of the type described and illustrated herein above in connection with the definition of polyester.

While the polyester of the invention has been described particularly with respect to the use of chlorendic acid or anhydride for its preparation, it is to be understood that any halogenated bicycloheptene carboxylic or anhydride compound prepared by the Diels-Alder reaction of a halogenated cyclopentadiene and an alpha, beta-unsaturated carboxylic compound can be used instead. Halogenated cyclopentadienes suitable for use in the preparation of such halogenated bicycloheptene carboxylic of anhydride compounds are further described in U.S. Pat. Nos. 3,367,905 and 2,890,144, the disclosures of which patents are hereby incorporated by reference.

Although the predominant polycarboxylic compound residue of the present polyester additives, namely the halogenated bicycloheptene polycarboxylic residue, which is typified by the chlorendic acid or anhydride residue, is ethylenically unsaturated, it is incapable, under normal conditions, of participating in the cross-linking reaction which is characteristic of conventional unsaturated polyesters.

While it is preferred that polyhydric compound residue of the polyesters employed in the invention be entirely derived from ethylene glycol or its corresponding oxide, ethylene oxide, the invention also includes polyesters prepared from mixtures of ethylene glycol and/or oxide containing up to 25 mole percent of other polyhydric compounds, either saturated or unsaturated, of the types described and illustrated above in connection with the definition of polyester.

The exact nature of the terminal functional groups in the polyesters incorporated in the compositions of the invention is not critical to the properties of efficacy of the present compositions of the resultant novel mixtures.

The polyesters of the invention are blended with polyvinyl halide or impact strength modified polyvinyl halide in the proportion of about 1 to about 30 parts by weight based upon one hundred parts by weight of the polyvinyl halide polymer mixture or polyvinyl halide with impact strength modifier. Preferably, about 1 to about 10 parts by weight of polyester are used and most preferably about 2 to about 5 parts by weight are utilized.

The impact strength modifiers used in the invention are polymers well known in the art and provide improved impact strength in polyvinyl halide when blended in the amount of about 3 to about 20 parts by weight based upon the weight of the polyvinyl halide. The commonly known impact modifiers include chlorinated polyethylene, butadiene, or butadiene-styrene rubbers, acrylonitril-butadiene-styrene modifiers, cross-linked alkylacrylate polymers and alkyl methacrylate-butadiene-styrene graft polymers. Since modification with such impact modifiers can lower the service temperature of the rigid vinyl chloride polymer compositions which is dictated by the softening temperature of the polymer mixture or by its heat distortion temperature or by its deformation temperature under load, it has become desirable to provide impact modified polyvinyl chloride compositions having good impact strength without serious reduction in service temperature.

It has been found that blends of the polyester of the invention with the above-described impact strength modified polyvinyl halide exhibit satisfactory service temperatures and at the same time improved impact strength as compared to said impact strength modified polyvinyl halide.

The molecular weight of the vinyl halide polymers including the graft copolymers of the invention is comparable to that of such polymers presently commercially produced by bulk polymerization which ranges from about 40,000 to about 125,000 by the weight average method. To determine molecular weight, relative solution viscosity, RSV, was measured in cyclohexanone at 25° centigrade using a 1% resin solution. The polymers useful in the invention vary by this method, between 1.6 and 2.7. Other test methods are described below.

Izod. impact strength (notched) was measured following the procedure of ASTM D-256. Heat distortion temperature was measured by ASTM D-648 at 264 psi.

The melt viscosity was measured at 400 degrees Fahrenheit/63 rpm using the Brabender Plasticorder. Fifty-five grams of sample containing 2 parts per 100 grams resin of a tin stabilizer sold under the trademark "Thermolite T-31" were charged into the Brabender chamber which was kept at 400 degrees Fahrenheit/63 rpm. After reaching the fusion point, the sample reaches an equilibrium torque. The equilibrium torque expressed in meter-grams (M-G) corresponds to the melt viscosity.

The compositions of the invention are useful in the production of molds prepared by extrusion, injection, blow, and sheet molding processes.

In order to further illustrate this invention, but without being limited thereto, the following examples are given. In this specification and claims, all parts and percentages are by weight, all pressures are gauge pressures, and all temperatures are in degrees centigrade unless otherwise specified.

EXAMPLE 1

A. Preparation of Adduct

Molten maleic anhydride, 672 parts (6.87 moles) was heated at 140 degrees as a current of oxygen was passed over the surface of the molten mass for about ten minutes. Thereafter, 1118 parts (4.1 moles) of hexachlorocyclopentadiene (98.7% pure, boiling point 125 degrees at 21 mm. pressure) were added to the molten anhydride at a rate sufficient to maintain the mixture at 150 to 155 degrees. The addition required about fifteen minutes. The mixture was heated at about 150 degrees for an additional 3.5 hours and then the pale yellow mass was cooled to ambient temperature in an atmosphere of nitrogen. The adduct mixture containing excess maleic anhydride was pulverized in a dry box.

B. Preparation of Polyester of the Invention

A mixture of 1174 parts of the adduct mixture prepared in Part A above and 0.47 part of lithium chloride was heated to about 120 degrees in an atmosphere of nitrogen and 49 parts (0.79 mole) of ethylene glycol were added over a period of about nine minutes. The mixture was agitated for about ten minutes and 164 parts (3.73 moles) of liquid ethylene oxide were added over a period of about 64 minutes. The temperature of the mixture during the addition varied over the range of 117 to 148 degrees. At the end of the ethylene oxide addition, the reactor pressure was about 45 p.s.i. The mixture was heated at about 125 degrees for about 15 minutes and then the product discharged into a glass tray. The yield of product was 1389 parts. The polyester product has an acid number of 24.6, melts at 115° centigrade, has a number average molecular weight of 1,885 by the vapor pressure osmometric method and contains 45% chlorine.

EXAMPLE 2

(Comparative Example)

A poly(propylene terephthalate) polyester is prepared using a two-liter resin kettle equipped with a close fitting spiral double blade stirrer, a nitrogen bubbler and a distillation column consisting of a steam jacketed column and a Dean-Stark take-off trap placed in an oil bath at 160° centigrade. A charge of 1,000 grams of dimethyl terephthalate, 876 grams of propylene glycol and 5 grams of litharge is placed in the kettle. As the temperature of the oil bath is increased, to about 230° centigrade, the reactants become clear and methanol evolves, indicating transesterification has begun. The temperature of the oil bath is maintained at 228° to 230° centigrade for a period of approximately 4-5 hours, during which time, about 85-94% of the theoretical amount of methanol is recovered. At this time, the nitrogen bubbler is replaced with a vacuum tight inlet valve and the distillation column replaced by a water cooled distillation head connected to a dry ice isopropanol cooling receiver. The pot temperature is allowed to cool to 210° centigrade and vacuum is slowly applied so that the rate of distillation of the excess propylene glycol is well controlled. After 2 hours, the system is placed under high vacuum and maintained at 0.2 millimeters mercury with a slow nitrogen feed until a Gardner-Holdt viscosity (25% in tetrachloroethane) of N-P is obtained. The amount of distillate obtained under vacuum during the total reaction time of 6 hours is about 450 to about 500 grams. A strong nitrogen flow is applied as the reaction vessel is brought to atmospheric pressure. The physical properties of the polyester are as follows:

Hydroxyl number—12.5 to 13.5
Acid number—2.8 to 3.5
Molecular weight—8,000

EXAMPLE 3

(Preparation of a Polyvinyl Chloride Graft Copolymer)

Into a one-liter glass autoclave equipped with a magnetic driven agitator having a spiral type stirring blade and a thermocouple, were added 20 g. ethylene-propylene rubber containing 55% ethylene of 76,700 weight average molecular weight and 270 g. vinyl chloride monomer. About 20 g. vinyl chloride were vented to remove air from the reactor. The pressure of the reactor was adjusted to 2.5 atmospheres pressure by introducing nitrogen gas. The reactor was heated to 60° centigrade while stirring and the rubber was dissolved within half an hour. The rubber solution was cooled down to 25° centigrade and then an additional 250 g. vinyl chloride were introduced in the reactor along with 0.03 ml. of a 29% solution of acetyl cyclohexane sulfonyl peroxide in dimethyl phthalate and 0.3 g. of 75% t-butyl peroxypivalate solution in mineral spirits. Twenty grams of vinyl chloride were vented to remove air and the pressure was adjusted to 2.5 atmospheres pressure by introducing nitrogen. The reaction mixture was heated to 65° centigrade while stirring. The reaction was carried out at 65° centigrade and 143 psig for 5 hours while stirring at 450 rpm.

At the end of the reaction period, the reaction mixture was cooled down to room temperature, the pressure was released and then 300 ml. methanol containing 0.5 g. di-t-butyl-p-cresol was introduced. After stirring for for 15 minutes, the reactor was opened up. The reaction mixture was filtered and the white powder reaction product was dried in vacuo overnight at 50° centigrade. The reaction product weighed 300 g. indicating 60 percent yield. The chlorine analysis indicated 6.7 percent ethylene-propylene rubber content.

EXAMPLE 4

(Comparative Example)

A polyester was prepared using the same procedure and ingredients as in Example 2, except that a charge of 750 grams of dimethyl terephthalate and 250 grams of chlorendic acid was used instead of 1,000 grams of dimethyl terephthalate to produce a polyester having a molecular weight of 8,000, a hydroxyl number of 12.5 to 13.5, and an acid number of 2.8 to 3.5.

EXAMPLE 5

(Comparative Example)

One hundred parts of the graft polyvinyl chloride prepared in Example 3 containing 6.7% ethylene propylene rubber was mixed on a two-roll mill, together with 2 parts on a weight basis of glycerol monostearate, 2 parts on a weight basis of a tin stabilizer sold under the trademark of "TM 181" by Cincinnati Milacron and 1 part by weight per 100 parts by weight of the graft copolymer of cobalt stearate. The roll mill was adjusted to a temperature of 200° centigrade and the components were mixed for 5 minutes. After the resin mixture had fused, it was sheeted out. Compression molds were made at 182° centigrade of the sheeted mixture to give a ⅛" thick sheet. Sample pieces were cut out of the sheet and notched Izod. impact strength as tested according to ASTM-D-256. The sample showed an Izod. impact strength of 1.8 ft.-lbs. per inch of notch.

EXAMPLE 6

Using the same procedure and ingredients as used in Example 5, except that 3.5 parts by weight based on 100 parts by weight of graft copolymer of the unsaturated polyester prepared in Example 1 were mixed on the two-roll mill together with the other ingredients used in Example 5. During processing on the two-roll mill, it was observed that the graft copolymer fused faster, formed a smoother and more glossy roll band around the roll as compared to the composition prepared in Example 5. These characteristics are clear indications of improved processability.

The notched Izod. impact strength of the ⅛" thick compression molded sheet was 6.8 ft.-lbs. per inch of notch, equivalent to about 4 times the value obtained in Example 5.

EXAMPLE 7

(Comparative Example)

The procedure of Example 6 was repeated using the ingredients of Example 6, except that there was substituted for the polyester as prepared in Example 1, the polyester prepared in Example 2 and, alternately, the polyester prepared in Example 4. Notched Izod. impact strength determinations on ⅛" thick compression molded sheets of these compositions showed impact strength of between 1.8 and 2 ft.-lbs. per inch of notch. While impact strength did not improve in these compositions it was noted that during processing on the two-roll mills that the graft copolymer fused faster, formed a smoother and more glossy roll band around the roll as compared to the composition of Example 5. These characteristics are clear indications of improved processability.

EXAMPLES 8-12

Compositions containing between 10 and 15 parts by weight of the polyester resin prepared in Example 1, based upon 100 parts by weight of a polyvinyl chloride of medium molecular weight sold under the trademark of "Ruco B-28" and of high molecular weight sold under the trademark "Ruco B-34" by the Ruco Division of Hooker Chemicals & Plastics Corp. were evaluated for processability using a Brabender Plastigraph (Model PL-5000-225) sold by the Brabender Co. The Brabender Plastigraph was equipped with roller blades adjusted to revolve at 40 rpm and heated to 200 degrees centigrade. ASTM D-2538 provides more details of the test procedure and is herein incorporated by reference. A total of 56.65 grams of polyvinyl chloride resin was used in combination with 3 grams per 100 grams of polyvinyl chloride of a stabilizer sold under the trademark of "Thermolite T-31" by the M & T Chemicals Co. were charged into the Brabender mixing bowl and the vertical ram was gently lowered to close the mixing bowl. When the ram is lowered the mixer is then allowed to run to obtain the fusion time and the equilibrium torque. The torque is continuously recorded and equilibrium is generally reached after an earlier maximum peak. The time elapsed to the maximum peak is called the fusion time. This is a measure of the ease of fusion of the resin composition. The equilibrium torque represents the equilibrium melt viscosity of the resin. The lower the melt viscosity, the easier processing is the resin. After the equilibrium torque has been obtained, the resin samples are discharged from the mixer and a film is prepared from each sample in order to determine the transparency of the film.

For determining the heat deflection temperature of the solid compositions, the test employed is in accordance with the ASTM D-648 specifications. The test specimens used are molded bars 5 inches in length and have a ½"×½" cross-section. The test composition is first dry blended and is then milled, as described hereinafter in more detail in connection with the examples, to form a coherent sheet which is subsequently removed from the mill and cooled. The resulting sheet is cut into strips which are molded at a temperature of about 340°-350° Fahrenheit and a pressure of about 1,000 p.s.i., to directly prepare specimen bars in the desired size for testing. The stress force used on the samples is 264 p.s.i. and the immersion medium is silicone oil heated during the test at an average rate, starting at about 23° centigrade, of 1° centigrade per minute. Typically, the resulting solid compositions of the invention maintain the heat deflection temperature of compositions prepared from polyvinyl chloride resin alone or augment such temperature in direct proportion to the concentration of polyester resin of the invention contained in the sample.

Effect of Polyester of Example 1 in Blends with Polyvinyl Chloride

| Example | Polyvinyl Chloride Type Homopolymer | Relative Solution Viscosity at 25° C.(1% in Cyclohexanone) | Polyester of Ex. 1 parts(wt)per 100 parts Polyvinyl Cl | Fusion Time Mins. | % Red. | Equilibrium Torque ASTM D-2538 M-G | % Reduction | Heat Deflection Temp.° C. ASTM-648 at 264 psi | Visual Transparency |
|---|---|---|---|---|---|---|---|---|---|
| 8 control | Medium molecular weight | 2.065 | 0 | 1.2 | — | 2670 | — | — | Water clear |
| 9 | " | " | 10 | 0.65 | 46 | 1840 | 31 | — | Water clear |
| 10 Control | High molecular weight | 2.34 | 0 | 2.1 | — | 3930 | — | 62 | Water clear |
| 11 | " | " | 10 | 1.1 | 48 | 2800 | 29 | 64 | Water clear |
| 12 | " | " | 15 | 0.7 | 67 | 1000 | 75 | 66 | Water clear |

EXAMPLES 13–18

(Comparative Examples)

Blends are prepared of 100 parts by weight of a polyvinyl chloride polymer containing 8 parts by weight of the following impact modifiers: chlorinated polyethylene, butadiene rubber, butadiene-styrene rubber, acrylonitrile-butadiene-styrene rubber, crosslinked ethyl acrylate polymer and methyl methacrylate-butadiene styrene graft polymer. The ingredients are mixed on a two-roll mill together with 2 parts by weight of glycerol monostearate, 2 parts by weight of a tin stabilizer sold under the trademark "TM 181" and 1 part by weight of cobalt stearate. The roll mill is adjusted to a temperature of 200° centigrade and the components mixed for 5 minutes. After the resin has fused, it is sheeted out. Compression molds are made at 182° centigrade of the sheeted mixture to give a ⅛" thick sheet. Sample pieces are cut from the sheet and tested for impact strength which is found to be under 2 ft. lbs. per inch of notch.

EXAMPLES 19–24

Using the same procedure and ingredients as in Examples 13–18 except that 5 parts by weight of the polyester of Example 1 are added in each sample, the resin is sheeted out after mixing to the fusion point on a two-roll mill and impact strength is evaluated. Impact strength is improved and is found to be greater than about 4 ft. lbs. per inch of notch.

While this invention has been described with reference to certain specific embodiments, it will be recognized by those skilled in the art that many variations are possible without departing from the spirit and scope of the invention.

What is claimed is:

1. A polymer composition comprising
   1. a vinyl halide polymer and
   2. a polyester composition additive consisting essentially of a polyester of number average molecular weight of about 1,000 to about 10,000 comprising a polycarboxylic component and a polyhydric component wherein said polycarboxylic component comprises at least about 75 mole percent of a halogenated bicycloheptene polycarboxylic compound, and wherein said polyhydric component comprises at least about 75 mole percent glycol, ethylene oxide, or mixtures thereof with the proviso that no more than about 5 mole percent of said polycarboxylic component are polycarboxylic components containing more than two carboxylic functional groups per molecule and no more than about 5 mole percent of said polyhydric component are polyhydric components containing more than two hydroxy groups or more than one oxide group per molecule; the proportion of the polyester composition additive being about 1 to about 30 percent by weight of the combined weight of the polyester composition additive and the vinyl halide polymer and the proportion of vinyl halide polymer being about 99 to about 70 percent by weight of the combined weight of the polyester composition additive and the vinyl halide polymer.

2. The composition of claim 1 wherein the halogenated bicycloheptene polycarboxylic compound is chlorendic acid or anhydride and the polyhydric component is ethylene glycol, ethylene oxide, or mixtures thereof.

3. The composition of claim 1 wherein said polyester is present in an amount of about 1 to about 10 percent by weight and said vinyl halide polymer is a vinyl chloride polymer and is present in the amount of about 90 to about 99 percent by weight and the polycarboxylic component in the polyester is chlorendic acid or anhydride.

4. A rigid sheet of the composition of claim 2.

5. A polymer composition comprising:
   1. about 70 to about 99 percent by weight of a vinyl chloride polymer and
   2. about 1 to about 30 percent by weight of a polyester composition additive consisting essentially of a polyester wherein the polycarboxylic component is chlorendic acid or anhydride and the polyhydric component is ethylene glycol, ethylene oxide, or mixtures thereof, said polyester having a number average molecular weight of about 1,000 to about 10,000.

* * * * *